UNITED STATES PATENT OFFICE.

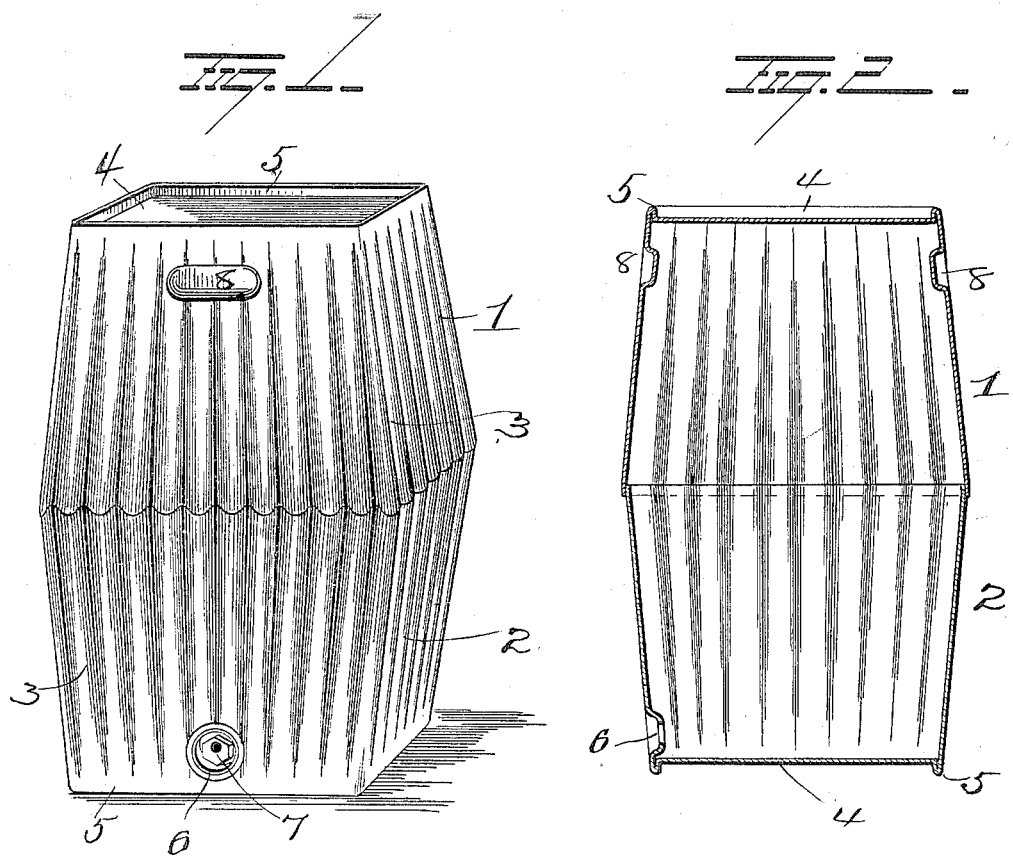

CHARLES R. HARRIS, OF WILLIAMSPORT, PENNSYLVANIA.

RECEPTACLE.

SPECIFICATION forming part of Letters Patent No. 660,107, dated October 23, 1900.

Application filed April 25, 1899. Serial No. 714,420. (No model.)

*To all whom it may concern:*

Be it known that I, CHARLES R. HARRIS, of Williamsport, in the county of Lycoming and State of Pennsylvania, have invented certain new and useful Improvements in Receptacles; and I do hereby declare the following to be a full, clear, and exact description of the invention, such as will enable others skilled in the art to which it appertains to make and use the same.

My invention relates to an improvement in liquid-receptacles, one object of the invention being to produce a receptacle that will be strong, durable, and air-tight and to so construct the receptacle that a number of them can be associated or packed in a manner to minimize space.

A further object is to provide a metallic receptacle which can be conveniently handled and which will be extremely simple in construction, cheap to manufacture, and most advantageous for all purposes.

With these objects in view the invention consists in certain novel features of construction and combinations and arrangements of parts, as will be more fully hereinafter described, and pointed out in the claim.

In the accompanying drawings, Figure 1 is a view in perspective, illustrating my improvements; and Fig. 2 is a view in section of the same.

My improved receptacle comprises two halves or sections 1 and 2, preferably stamped or drawn from sheet-steel and corrugated longitudinally, as shown at 3, to give the receptacle greater strength. The sections 1 2 are made square in horizontal section and are stamped at their closed ends, so as to form inwardly-depressed portions 4 and flanged edges or chimes 5. The sections 1 2 bulge outward from their closed ends, as shown, so that when the sections are put together the central portion of the receptacle will have the greatest diameter. The open ends of the sections 1 and 2 are telescoped slightly on each other and the two sections rigidly joined by electric welding or electric brazing. The lower section 2 is provided near its lower portion with a depressed screw-threaded socket 6 for the reception of a suitable bung 7, as shown. The upper section 1 of the receptacle is provided at diametrically-opposite points, near the upper end thereof, with suitable depressions 8 of a size sufficient to permit the insertion of the fingers, and the depressions are so spaced from the flanged upper edge of the receptacle that when the fingers are placed in the depressions the thumb and rest of the hand will rest against the flanged upper edge or chime of the receptacle and permit the firm hold on the receptacle for conveniently handling the same.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

As a new article of manufacture, a receptacle comprising two sheet-metal sections each larger at one end than at the other and having their smaller ends closed, each section made angular in cross-section and each having longitudinal corrugations in each side and extending from the larger ends to points inwardly removed from their smaller ends, the larger ends of the sections overlapping with the corrugations intermeshing and permanently secured, and one of said sections having depressions near one end at diametrically-opposite sides to form handholds.

In testimony whereof I have signed this specification in the presence of two subscribing witnesses.

CHARLES R. HARRIS.

Witnesses:
 E. G. WILHELM,
 L. B. HARTMAN.